United States Patent
Wanat et al.

(10) Patent No.: US 7,294,399 B2
(45) Date of Patent: Nov. 13, 2007

(54) WEATHER-RESISTANT, HIGH-IMPACT STRENGTH ACRYLIC COMPOSITIONS

(75) Inventors: Robert A. Wanat, Langhorne, PA (US); Charles C. Crabb, Royersford, PA (US); Dennis J. Labanoski, Yardley, PA (US)

(73) Assignee: Arkema France, Colombes (FR)

( * ) Notice: Subject to any disclaimer, the term of this patent is extended or adjusted under 35 U.S.C. 154(b) by 76 days.

(21) Appl. No.: 10/395,643

(22) Filed: Mar. 24, 2003

(65) Prior Publication Data

US 2003/0216510 A1 Nov. 20, 2003

Related U.S. Application Data

(60) Provisional application No. 60/369,359, filed on Apr. 2, 2002.

(51) Int. Cl.
*C08L 51/00* (2006.01)
*C08L 51/04* (2006.01)

(52) U.S. Cl. .............. 428/412; 428/483; 428/500; 525/64; 525/67; 525/85; 525/87

(58) Field of Classification Search ........... 428/412, 428/483, 500, 522; 525/64, 67, 85, 87
See application file for complete search history.

(56) References Cited

U.S. PATENT DOCUMENTS

| | | | |
|---|---|---|---|
| 3,661,994 A | 5/1972 | Hwa et al. | |
| 3,793,402 A | 2/1974 | Owens | |
| 3,922,321 A | 11/1975 | Yusa et al. | |
| 4,007,985 A * | 2/1977 | Yevick | 355/46 |
| 4,101,702 A * | 7/1978 | Churchill et al. | 428/213 |
| 4,249,331 A * | 2/1981 | Vernon | 40/432 |
| 4,433,103 A | 2/1984 | Kamata et al. | 525/81 |
| 4,513,118 A * | 4/1985 | Suetterlin et al. | 525/81 |
| 4,521,568 A | 6/1985 | Mori et al. | 525/309 |
| 4,730,023 A * | 3/1988 | Sato et al. | 525/73 |
| 5,204,406 A | 4/1993 | Fujii et al. | |
| 5,232,786 A * | 8/1993 | Waters et al. | 428/475.8 |
| 5,270,397 A | 12/1993 | Rhein et al. | 525/309 |
| 5,318,737 A | 6/1994 | Trabert et al. | 264/171 |
| 5,726,245 A * | 3/1998 | Numrich et al. | 525/85 |
| 6,172,135 B1 | 1/2001 | Fraser et al. | 523/201 |
| 6,218,447 B1 * | 4/2001 | Sugaya et al. | 523/201 |
| 6,828,366 B2 * | 12/2004 | Seidel et al. | 524/127 |

FOREIGN PATENT DOCUMENTS

| | | |
|---|---|---|
| EP | 0 458 520 A2 | 5/1991 |
| WO | WO 00/08098 | 2/2000 |

* cited by examiner

*Primary Examiner*—Jeffrey Mullis
(74) *Attorney, Agent, or Firm*—Thomas F. Roland; Gilbert W. Rudman

(57) ABSTRACT

Disclosed is an improved weatherable thermoplastic composition. The composition is comprised of a copolymer of an alkyl acrylate or alkyl methacrylate and (methyl)methacrylate and a multi-stage, sequentially-polymerized impact modifier polymer. The copolymer is characterized by greater than 15 weight percent alkyl acrylate content. The multi-stage, sequentially-polymerized impact modifier is characterized by an elastomer stage, which is 55 percent by weight or greater of the impact modifier composition and is minimally crosslinked. The thermoplastic composition can be used in a wide range of film, sheet, or molded applications.

18 Claims, No Drawings

WEATHER-RESISTANT, HIGH-IMPACT STRENGTH ACRYLIC COMPOSITIONS

REFERENCE TO RELATED APPLICATION

This application claims the benefit of U.S. Provisional Application Ser. No. 60/369,359, filed Apr. 2, 2002.

BACKGROUND OF THE INVENTION

1. Field of the Invention

This invention relates to weather-resistant, high-impact strength (meth)acrylic compositions useful for producing (meth)acrylic articles or as a capcoat layer for polymeric substates, especially PVC.

2. Prior Art

Acrylic compositions and articles made from them are well known for their clarity, sparkling color, surface gloss and weather resistance. They are also well known for their low-impact strength or brittleness. It has become standard practice to incorporate toughening agents or impact modifiers in acrylic formulations to make them more durable. The incorporation of such functional additives can, however, detract from some of the desirable characteristics of the acrylics, for example the addition of large quantities of rubbery polymers can lower the softening point and contribute to haze.

There have been many attempts to improve the acrylic composition by forming copolymers, which are intended to modify the physical properties of the acrylic polymer. Other approaches include the use of additives intended to improve physical properties such as impact strength, generally known as polymeric impact modifiers. The polymeric impact modifiers include a wide variety of polymers, such as natural and synthetic rubber, acrylate rubbers, and terpolymers such as MBS (methylmethacrylate/butadiene/styrene).

One type of polymeric impact modifier is sequentially polymerized acrylic compositions comprising a core, an intermediate and a final stage, although there can be some intermingling of the "layers". In general, these are known as "core/shell" polymers.

There are many factors which determine the efficiency and utility of any specific acrylic core/shell impact modifier. These include the matrix in which it is used or the substrate to which it is adhered whether alone or as part of a capstock composition. Also highly influent are the number of layers in each stage, the thickness and construction of each layer, the monomer composition of each layer, the type and degree of crosslinking of each layer, the type and degree of grafting, as well as the concentration of the sequentially polymerized core/shell impact modifier in the matrix or primary polymer. The matrix polymer or primary polymer as defined herein is the polymer which forms the bulk of the articles, such as acrylic sheet, or an extruded capstock.

Specific examples of core/shell impact modifiers can be found in the following referenced patents: U.S. Pat. No. 3,661,994; U.S. Pat. No. 3,793,402; U.S. Pat. No. 4,433,103; U.S. Pat. No. 4,521,568; U.S. Pat. No. 5,270,397; U.S. Pat. No. 6,172,135; U.S. Pat. No. 5,318,737; EP 0,458,520A2; and WO 00/08098.

SUMMARY OF THE INVENTION

Improved weather-resistant, high-impact strength (meth) acrylic compositions have been developed. The compositions are comprised of a copolymer of an alkyl acrylate or alkyl methacrylate and poly(methyl)methacrylate and a multi-stage, sequentially-polymerized impact modifier polymer. The copolymer is comprised of at least 15 weight percent alkyl acrylate. The multi-stage, sequentially-polymerized impact modifier has an elastomer stage which is at least 55 percent by weight or greater of the impact modifier composition and is minimally crosslinked.

DETAILED DESCRIPTION OF THE INVENTION

The thermoplastic composition of the present invention comprises a blend of about 40-90 weight percent of a rigid thermoplastic copolymer and 10-60 weight percent of a multi-stage, sequentially-produced polymer.

The rigid thermoplastic copolymer consists of the monomer methyl methacrylate at a level of 50-85% copolymerized with another alkyl acrylate or alkyl methacrylate wherein the alkyl group consists of 1 to 4 carbon atoms and is present at a level of 15-50% weight percent.

Acrylic matrices containing high levels of comonomer such as ethyl acrylate require a specifically designed impact modifier in order to take advantage of the increased ductility of the matrix.

The multi-stage, sequentially-produced polymer is a specifically designed impact modifier and is characterized by:

(a) a optionally, but preferably, non-elastomeric, relatively hard first stage having a glass transition temperature of greater than 25° C., polymerized from a monomer mixture of the monomers described above for the rigid thermoplastic copolymer along with 0 to 10 weight percent of a copolymerizable polyfunctional crosslinking monomer, and 0 to 10 weight percent of a copolymerizable graftlinking monomer having two or more addition polymerizable unsaturated reactive groups which participate in the polymerization reaction at substantially different rates, such as an allyl, methallyl or crotyl ester of an $\alpha,\beta$-unsaturated carboxylic acid or diacid;

(b) an intermediate elastomeric stage polymerized in the presence of a product containing the first stage from a monomer mixture comprising 50 to 99.9 weight percent of an alkyl acrylate and/or alkyl methacrylate mixtures thereof wherein the alkyl groups contain 1 to 8 carbon atoms, 0 to 49.9 weight percent of a copolymerizable monoethylenically unsaturated monomer, 0 to 5.0 weight percent of a copolymerizable polyfunctional crosslinking monomer and 0.05 to 5.0 weight percent of a copolymerizable graftlinking monomer as described above, said elastomeric stage further characterized in that it would exhibit a glass transition temperature of 25° C. or less if the monomers were polymerized in the absence of the product containing the first stage; and (c) one or more, relatively hard, final stages polymerized in the presence of a product containing the first and intermediate stages from a monomer mixture of the monomers described above for the rigid thermoplastic polymer, the final stage further characterized in that it would exhibit a glass transition temperature of greater than 50° C. if the monomers were polymerized in the absence of the product containing the first and intermediate stages, the graft linking monomer having two or more addition polymerizable unsaturated reactive groups which participate in the polymerization reaction at substantially different rates and the cross-linking monomer having a plurality of addition polymerizable unsaturated groups all of which participate in the polymerization reaction at about the same rate as one another.

Preferably the multi-stage polymer is a three stage composition wherein the stages are present in ranges of 10 to 40 percent by weight, preferably 10 to 20 percent, of the first stage (a), 45 to 70 percent, preferably 50 to 60, of the second intermediate stage (b), and 10 to 50 percent, preferably 20 to 40, of the final stage (c), all percentages based on the total weight of the three-stage polymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers (which term includes copolymers as well as homopolymers) which are prepared in aqueous dispersion or emulsion and in which successive monomer changes are polymerized onto or in the presence of a preformed latex prepared by the polymerization of a prior monomer charge and stage. In this type of polymerization, the succeeding stage is attached to and intimately associated with the preceding stage. Thus, the sequentially prepared polymers of the present invention are made by a process in which the total particle content is substantially constant upon completion of the first-stage polymerization, i.e., new additional and distinct particles are avoided after formation of the first-stage particle.

The polymerizations are carried out in the presence of an initiator and may include a polymerization regulator which serves as a chain transfer agent. The final particle size of the sequentially produced polymer may vary from 100 to 350 nm with the preferred range being 200 to 300 nm.

The type and level of emulsifier utilized controls the particle size of the intermediate-stage latex particles. For the most part, the soaps normally used in emulsion polymerization can be used satisfactorily provided care is exercised in utilizing the minimum amount necessary to give the desired result and the polymer is isolated by coagulation. If the latex is isolated by spray drying, the selection of emulsifier becomes more critical since it remains with the polymer.

The level of emulsifier is preferably below one percent by weight, preferably 0.1 to 0.6%, based on the total weight of polymerizable monomers charged in all stages. Useful emulsifying agents include common soaps, alkylbenzenesulfonates, such as sodium dodecyl benzenesulfonate, alkylphenoxypolyethylene sulfonates, sodium lauryl sulfate, salts of long-chain amines, salts of long-chain carboxylic and sulfonic acids, etc. In general, the emulsifier should be compounds containing hydrocarbon groups of 8-22 carbon atoms coupled to highly polar solubilizing groups such as alkali metal and ammonium carboxylate groups, sulfate half ester groups, sulfonate groups, phosphate partial ester groups and the like.

The polymerization medium in each stage will contain an effective amount of a suitable free radical generating polymerization initiator, which is activated either thermally or by an oxidation-reduction (or redox) reaction. The preferred initiators are those which are activated thermally, such as persulfates; however, redox initiators may be used. Examples of suitable oil-soluble, water-insoluble initiators are combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc. Water-soluble redox initiators may also be used; initiator combinations are sodium persulfate-sodium hydrosulfite, potassium persulfate-sodium formaldehyde sulfoxylate, etc.

The multi-stage sequential emulsion polymerization can be carried out at temperatures ranging from about 0° C. to 125° C., with 30° C. to 95° C. being preferred. The polymerization medium may contain, in accordance with known practice, a chain transfer agent such as tertiary dodecyl mercaptan, secondary butyl mercaptan, normal dodecyl mercaptan, and the like, particularly for limiting, where desired, the molecular weight of stages containing lower alkyl methacrylate. The free radical initiator will be used in an effective amount, which will vary depending on the monomers, the temperature and the method of addition, but, generally, the quantity of initiator will vary from about 0.001 to 2% by weight in each polymerization stage based on the weight of the monomer charge but should not exceed about 5% by weight based on the total weight of the monomers charged in all stages.

The rigid thermoplastic copolymer consists of the monomer methyl methacrylate at a level of 50-85% copolymerized with another alkyl acrylate or alkyl methacrylate wherein the alkyl group consists of 1 to 4 carbon atoms and is present at a level of 15-50% weight percent. The molecular weight of the copolymer is in the range of 50,000 to about 400,000 daltons. Preferred monomers are ethyl acrylate and methyl acrylate at levels of about 25 weight percent with a molecular weight of 200,000-350,000 daltons. The rigid thermoplastic can be prepared by any standard method of preparing high polymers of methacrylates and acrylates, include bulk, solvent, and emulsion polymerization.

The present invention is a product having improved toughness which is based on an acrylic matrix containing high levels of comonomer. Rubber toughened acrylic resins are widely used in applications where the beneficial properties of acrylics (clarity, weathering, etc.) are desired, but where standard unmodified acrylic resins lack the desired level of impact toughness. The usual way of rubber toughening an acrylic resin is by incorporating an acrylic-based, core-shell impact modifier into the resin. Most commercial impact acrylics consist of a matrix made from methylmethacrylate (MMA) and a relatively small amount of comonomer, usually about 0.5 to 10% methylacrylate (MA) or ethylacrylate (EA). A core-shell impact modifier is added to the matrix at about 10-50% level by weight.

In the present invention it has been found that much higher toughness levels can be achieved by increasing the comonomer content of the matrix and then redesigning the modifier for the new matrix. A matrix containing 25% EA as a comonomer is one such example. In the present invention it is possible to make a weatherable impact acrylic with up to six times the impact strength of standard commercially available impact acrylics.

Another application for the invention is as a PVC capstock. Rigid PVC is used extensively for exterior building applications such as siding because of its durability and low price. However, PVC undergoes degradation from the effects of weathering. This results in a color change and/or a decrease in impact strength. Various methods have been tried to overcome this shortcoming. Often the PVC is loaded up with UV-absorbing pigments such as $TiO_2$. Most often PVC siding is co-extruded with a thin highly-pigmented layer extruded over a thicker layer containing much less pigment. The top layer provides UV opacity to protect the lower layer without incurring the expense of putting high levels of pigment throughout the thickness. These co-extruded structures show improved weatherability over straight PVC. However, fading still occurs, so there is a desire for an even more weatherable capstock. One such material is acrylic. Acrylics are very resistant to the effects of outdoor weathering and will, thus, maintain their initial appearance after many years of outdoor exposure. One drawback of acrylics is impact strength. Extruding a thin acrylic capstock layer over PVC embrittles the composite structure. This has been true for all impact modified and unmodified acrylics. This has limited their use as capstock materials for PVC.

However, we have found that this problem can be overcome through the use of a specially designed impact acrylic. It is necessary for the acrylic to have sufficient ductility that fracture does not begin in the acrylic layer (at least before significant deformation has occurred). There are a number of ways to make such a ductile acrylic: impact acrylics usually consist of a blend of matrix polymer and impact modifier. High levels of impact modifier increase ductility although there is a practical limit of how much impact modifiers can be added. 50-60% seems to be an upper limit depending on the processing equipment used. More commonly 20-45% is used.

The matrix in most impact acrylics consists primarily of methylmethacrylate (MMA) copolymerized with a small amount of an acrylate (usually MA or EA), usually 1-10%. The acrylate provides enhanced thermal stability. However, instead of a small amount of acrylate, if a larger amount of short-chain acrylate (or methacrylate) is used, the resultant impact grade will have sufficient ductility for use as a capstock over PVC. Current work suggests, that if EA is used as the comonomer, then approximately about 25% of EA is necessary to obtain the necessary ductility. (Other comonomers are expected to be functional at different levels.)

In order to take advantage of the increased ductility of the matrix, an impact modifier specifically designed for the matrix needs to be incorporated. We have found that the impact modifiers we use in standard impact acrylics are not effective at increasing the impact strength of the ductile matrix. The following changes are beneficial in improving the impact:

Increasing the elastomer content
Decreasing the crosslinker/graftlinker level in the elastomer stage
Reduce the Tg of the hard core Interestingly, it does not appear to be necessary to adjust the composition of the outer shell to match that of the matrix. We have obtained similar impact strength whether the outer shell is 95/5 MMA/EA or 75/25 MMA/EA. There is, however, an advantage in optics in matching the composition of the outer shell to the matrix (refractive index match). There may be advantages in isolation efficiencies and powder properties in having an outer shell with minimal amounts of EA.

Another application for the present invention is in an application known as "in-mold decorating" where films of clear acrylic polymers are die-cut to the desired size and shape. Die cutting is also commonly used in fabrication of parts from plastic sheet and rollstock for applications such as point-of-purchase displays. Die-cutting is a quick and economical mechanical process. While acrylics have many desirable properties for use in mold decorating, such as appearance and weatherability, they suffer from the inability to be die-cut without undergoing brittle fracture. Brittle fracture produces chips and cracks which preclude its use in these applications. A composition with all of the beneficial properties of acrylics but is ductile enough to be die-cut without cracking is needed. This can be achieved by making an impact acrylic based on a ductile matrix (for example, 25% EA) such as is described above with the addition of a core/shell acrylic impact modifier as described herein. Just as the ductile nature of this film allows it to be used for in-mold decorating, it also enables the film to have application as a free film or in film lamination. In these applications, the ductility of the film improves handling characteristics and reduces the tendency of the film to crack or break in the film handling and lamination steps of the processing. In all of these multilayer compositions, the choice of the substrate polymer is restricted only by the ability to obtain acceptable adhesion between the acrylic composition and the substrate. Examples of such substrate polymers include, but are not limited to: (meth)acrylic polymers and copolymers; polycarbonate; polyester and copolyesters; vinyl polymers and copolymers, including polyvinyl chloride; styrene polymers and copolymers, including acrylonitile-butadiene-styrene copolymer, polystyrene, and high impact polystyrene Another use of the present invention is as in a high-impact sheet and as an injection molding resin. Traditional impact modified acrylics do not have the necessary toughness for some applications where high impact strength is important. These applications require the use of other polymers such as polycarbonate or PETG which, while tougher than standard impact modified acrylics, do not have near the weatherability or optical clarity of acrylics. It is possible to make an impact acrylic based on a ductile matrix such as described above which provides the necessary toughness of these applications while retaining the advantages of weatherability and optical clarity.

The following examples are illustrative of the invention but are not intended to be exhaustive or to limit the invention to the precise form disclosed. Many other variations and modifications are possible in light of the specification and examples.

EXAMPLE 1

This example illustrates the preparation of a multi-stage, sequentially produced polymer of composition.

The ratio of the three stages was 15//65//20
The composition of the three stages was
Stage 1: 74.8/25/0.2 MMA/EA/ALMA
Stage 2: 83.5/15.5/1.0 BA/Sty/ALMA
Stage 3: 95/5 MMA/EA
MMA=methyl methacrylate
EA=ethyl acrylate
BA=butyl acrylate
Sty=styrene
ALMA=allyl methacrylate A monomer charge consisting of 34% of Stage 1 was emulsified in water using potassium dodecyl benzene sulfonate as the emulsifier and using potassium carbonate to control the pH was polymerized using potassium persulfate at elevated temperatures. The remaining portion of Stage 1 was then added to the preformed polymer emulsion and was polymerized using potassium persulfate at elevated temperatures controlling the amount of soap added to prevent the formation of a significant number of new particles. The Stage 2 monomers were then added and polymerized using potassium persulfate at elevated temperatures controlling the amount of soap added to prevent the formation of a significant number of new particles. The third stage monomers were then polymerized using potassium persulfate at elevated temperatures and again controlling the amount of soap added to prevent the formation of a significant number of new particles. The polymer was isolated by coagulation, freeze-drying, or spray-drying.

EXAMPLE 2

This polymer was prepared in a manner similar to Example 1 except that it had different stage ratios:
The ratio of the three stages was 12.5//54.2//33.3
The composition of the stages was
Stage 1: 74.8/25/0.2 MMA/EA/ALMA
Stage 2: 83.5/15.5/1.0 BA/Sty/ALMA
Stage 3: 95/5 MMA/EA

EXAMPLE 3

The same as Example 2 except that a 0.46 parts of n-dodecyl mercaptan were added to the latter part of the third stage to decrease the molecular weight.

EXAMPLE 4 (Comparative)

Example 4 was a polymer of the kind taught in Owens (U.S. Pat. No. 3,793,402) prepared for comparative purposes. This polymer was prepared similar to Example 1 except that the composition was as follows:
The ratio of the three stages was 35//45//20
The composition of the three stages is
Stage 1: 95.8/0.4/0.2 MMA/EA/ALMA
Stage 2: 80/18/2.0 BA/Sty/ALMA
Stage 3: 96/4 MMA/EA

EXAMPLES 5-8

The polymers of Examples 1-4 blended with 60% poly (methyl methacrylate-co-ethyl acrylate) matrix and blended on an extruder.

| | | Composition |
|---|---|---|
| Example 5 | 40% Example 1 | 60% poly (methyl methacrylate-co-ethyl acrylate) 75/25 MMA/EA |
| Example 6 | 40% Example 2 | 60% poly (methyl methacrylate-co-ethyl acrylate) 75/25 MMA/EA |
| Example 7 | 40% Example 3 | 60% poly (methyl methacrylate-co-ethyl acrylate) 91/9 MMA/EA |
| Example 8 Comparative | 40% Example 4 | 60% poly (methyl methacrylate-co-ethyl acrylate) 91/9 MMA/EA |

Examples 5-8 were molded into ⅛"plaques and the energy required to initiate a crack during an instrumented dart impact test measured.

| | Instrumented Dart First-Break Energy |
|---|---|
| Example 5 | 25 J |
| Example 6 | 15 J |
| Example 7 | 15 J |
| Example 8 Comparative | 4.5 J |

This table clearly shows the advantages of having an optimized elastomeric polymer dispersed in a pMMA matrix containing a high level of EA comonomer.

EXAMPLES 9-10 (Comparative)

Examples 9-10, prepared the same way as Examples 5-8, demonstrate that if either the elastomeric polymer or the matrix is changed to that contained in Example 7 then the high impact strength is lost.

| | | Composition | Instrumented Dart First-Break Energy |
|---|---|---|---|
| Example 9 Comparative | 40% Example 1 | 60% poly (methyl methacrylate-co-ethyl acrylate) 91/9 MMA/EA | 6.4 J |
| Example 10 Comparative | 40% Example 4 | 60% poly (methyl methacrylate-co-ethyl acrylate) 75/25 MMA/EA | 4.7 J |

EXAMPLES 11-13

Examples 11-13 consist of the materials from Examples 5, 6 and 8 co-extruded over PVC at a thickness of about 4 mil. The PVC thickness was about 46 mil. The GVHIT impact strength of the composite is then tested as per ASTM-D4226-00.

| | GVHIT |
|---|---|
| Example 11 | 3.07 in-lb./mil |
| Example 12 | 2.43 in-lb./mil |
| Example 13 Comparative | 0.80 in-lb./mil |

The advantages of materials like Example 11 and Example 12 over more traditional acrylics like Example 13(Comparative) are readily apparent. Example 13 does not meet the current impact specification for vinyl siding.

What is claimed is:
1. A thermoplastic composition comprised of
   a. about 40-90 weight percent of a rigid thermoplastic copolymer matrix consisting of 50-85 weight percent methyl methacrylate, and 15-50 weight percent of an alkyl acrylate selected from the group consisting of ethyl acrylate, methyl acrylate, and mixtures thereof; and
   b. about 10-60 weight percent of a multi-stage, sequentially-produced polymer characterized by:
      (A) a first stage which is optionally non-elastomeric, relatively hard, and has a glass transition temperature of greater than 25° C., and which is polymerized from a monomer mixture consisting of 50-85 weight percent of methyl methacrylate, and 15-50 weight percent of an alkyl acrylate selected from the group consisting of ethyl acrylate, methyl acrylate, and mixtures thereof, 0 to 10 weight percent of a copolymerizable polyfunctional crosslinking monomer, and 0 to 10 weight percent of a copolymerizable graftlinking monomer having two or more addition polymerizable unsaturated reactive groups which participate in the polymerization reaction at substantially different rates said percentages of said alkyl acrylate, methyl methacrylate, polyfunctional crosslinking monomer and graftlinking monomer adding up to 100 percent;

(B) an intermediate stage which is elastomeric and which is polymerized in the presence of the first stage, from a monomer mixture comprising 50 to 99.9 weight percent of an alkyl acrylate and/or alkyl methacrylate mixtures thereof wherein the alkyl groups contain 1 to 8 carbon atoms, 0 to 49.9 weight percent of a copolymerizable monoethylenically unsaturated monomer, 0 to 5.0 weight percent of a copolymerizable polyfunctional crosslinking monomer, and 0.05 to 5.0 weight percent of a copolymerizable graftlinking monomer as described above, said intermediate stage further characterized in that it would exhibit a glass transition temperature of 25° C. or less if the monomers were polymerized in the absence of the first stage; and (C) at least one final stage which is relatively hard and which is polymerized in the presence the first and intermediate stages from a monomer mixture of the monomers described above for the rigid thermoplastic polymer, the final stage further characterized in that it would exhibit a glass transition temperature of greater than 50° C. if the monomers were polymerized in the absence of first and intermediate stages, the graft linking monomer having two or more addition polymerizable unsaturated reactive groups which participate in the polymerization reaction at substantially different rates and the cross-linking monomer having a plurality of addition polymerizable unsaturated groups all of which participate in the polymerization reaction at about the same rate as one another.

2. The composition of claim 1 wherein the multi-stage polymer is a three stage composition wherein the stages are present in ranges of 10 to 40 percent by weight of the first stage (A), 45 to 70 percent of the second intermediate stage (B), and 10 to 50 percent of the final stage (C), all percentages based on the total weight of the three-stage polymer.

3. The composition of claim 1 wherein the multi-stage polymer is a three stage composition wherein the stages are present in ranges of 10 to 20 percent of the first stage (A), 50 to 60 percent of the second intermediate stage (B), and 20 to 40 percent of the final stage (C), all percentages based on the total weight of the three-stage polymer.

4. A coextruded sheet or profile where at least one layer consists of the thermoplastic composition of claim 1.

5. The coextruded sheet or profile of claim 4 wherein a layer of the coextruded sheet is selected from the group consisting of (meth)acrylic polymers and copolymers; polycarbonate; polyesters and copolyesters; vinyl polymers and copolymers, and styrene polymers and copolymers.

6. The coextruded sheet or profile of claim 5 where the claimed resin is used in an outer layer as a weather resistant capstock.

7. The thermoplastic composition of claim 1, wherein said rigid thermoplastic matrix copolymer consists of 50-75 weight percent methyl methacrylate, and about 25 weight percent of ethyl acrylate.

8. The thermoplastic composition of claim 1 wherein said composition has the characteristic of being die-cut without cracking or undergoing brittle fracture.

9. An extruded sheet or profile made from a weatherable thermoplastic composition comprising a matrix copolymer of an alkyl acrylate and methylmethacrylate and a multi-stage, sequentially-polymerized impact modifier polymer, the copolymer characterized by greater than 15 weight percent alkyl acrylate content, wherein the alkyl group consists of 1 to 4 carbon atoms, and the multi-stage, sequentially-polymerized impact modifier characterized by a core polymer consisting of 50-85 weight percent of methyl methacrylate, and 15-50 weight percent of an alkyl acrylate selected from the group consisting of ethyl acrylate, methyl acrylate, and mixtures thereon 0 to 10 weight percent of a copolymerizable polyfunctional crosslinking monomer, and 0 to 10 weight percent of a copolymerizable graftlinking monomer; said percentages of said alkyl acrylate, methyl methacrylate, polyfunctional crosslinking monomer and graftlinking monomer adding up to 100 percent and an elastomer stage which is 55 percent by weight or greater of the impact modifier polymer and said elastomer stage containing from 0 to 5 weight percent of polyfunctional crosslinking monomer units.

10. The extruded sheet or profile of claim 9, wherein said matrix copolymer consists of about 25 weight percent alkyl acrylate content.

11. An embossed sheet made from a weatherable thermoplastic composition comprising a matrix copolymer of an alkyl acrylate and methylmethacrylate and a multi-stage, sequentially-polymerized impact modifier polymer, the copolymer characterized by greater than 15 weight percent alkyl acrylate content, wherein the alkyl group consists of 1 to 4 carbon atoms, and the multi-stage, sequentially-polymerized impact modifier characterized by a core polymer consisting of 50-85 weight percent of methyl methacrylate, and 15-50 weight percent of an alkyl acrylate selected from the group consisting of ethyl acrylate, methyl acrylate, and mixtures thereof, 0 to 10 weight percent of a copolymerizable polyfunctional crosslinking monomer, and 0 to 10 weight percent of a copolymerizable graftlinking monomer; said percentages of said alkyl acrylate, methyl methacrylate, polyfunctional crosslinking monomer and graftlinking monomer adding up to 100 percent and an elastomer stage which is 55 percent by weight or greater of the impact modifier polymer and said elastomer stage containing from 0 to 5 weight percent of polyfunctional crosslinking monomer units.

12. The embossed sheet of claim 11, wherein said matrix copolymer consists of about 25 weight percent alkyl acrylate content.

13. A film comprising a weatherable thermoplastic composition comprising a matrix copolymer of an alkyl acrylate and methylmethacrylate and a multi-stage, sequentially-polymerized impact modifier polymer, the matrix copolymer characterized by 50 to 85 weight percent methyl methacrylate and 15-50 weight percent alkyl acrylate content, selected from the group consisting of ethyl acrylate, methyl acrylate, and mixtures thereof, and the multi-stage, sequentially-polymerized impact modifier characterized by a core polymer consisting of 50-85 weight percent of methyl methacrylate, and 15-50 weight percent of an alkyl acrylate selected from the group consisting of ethyl acrylate, methyl acrylate, and mixtures thereof, 0 to 10 weight percent of a copolymerizable polyfunctional crosslinking monomer, and 0 to 10 weight percent of a copolymerizable graftlinking monomer; said percentages of said alkyl acrylate, methyl methacrylate, polyfunctional crosslinking monomer and graftlinking monomer adding up to 100 percent and an elastomer stage which is 55 percent by weight or greater of the impact modifier polymer and said elastomer stage containing from 0 to 5 weight percent of polyfunctional crosslinking monomer units.

14. The film of claim 13 made into a multilayer film.

15. The film of claim 13 used for in-mold decorating.

16. The film of claim 13 laminated to a plastic sheet or profile.

17. The film of claim 13 used as a protective layer in a sign or reflective sign.

18. The film of claim 13, wherein said matrix copolymer consists of about 25 percent alkyl acrylate content.

* * * * *